United States Patent Office 3,163,181
Patented Dec. 29, 1964

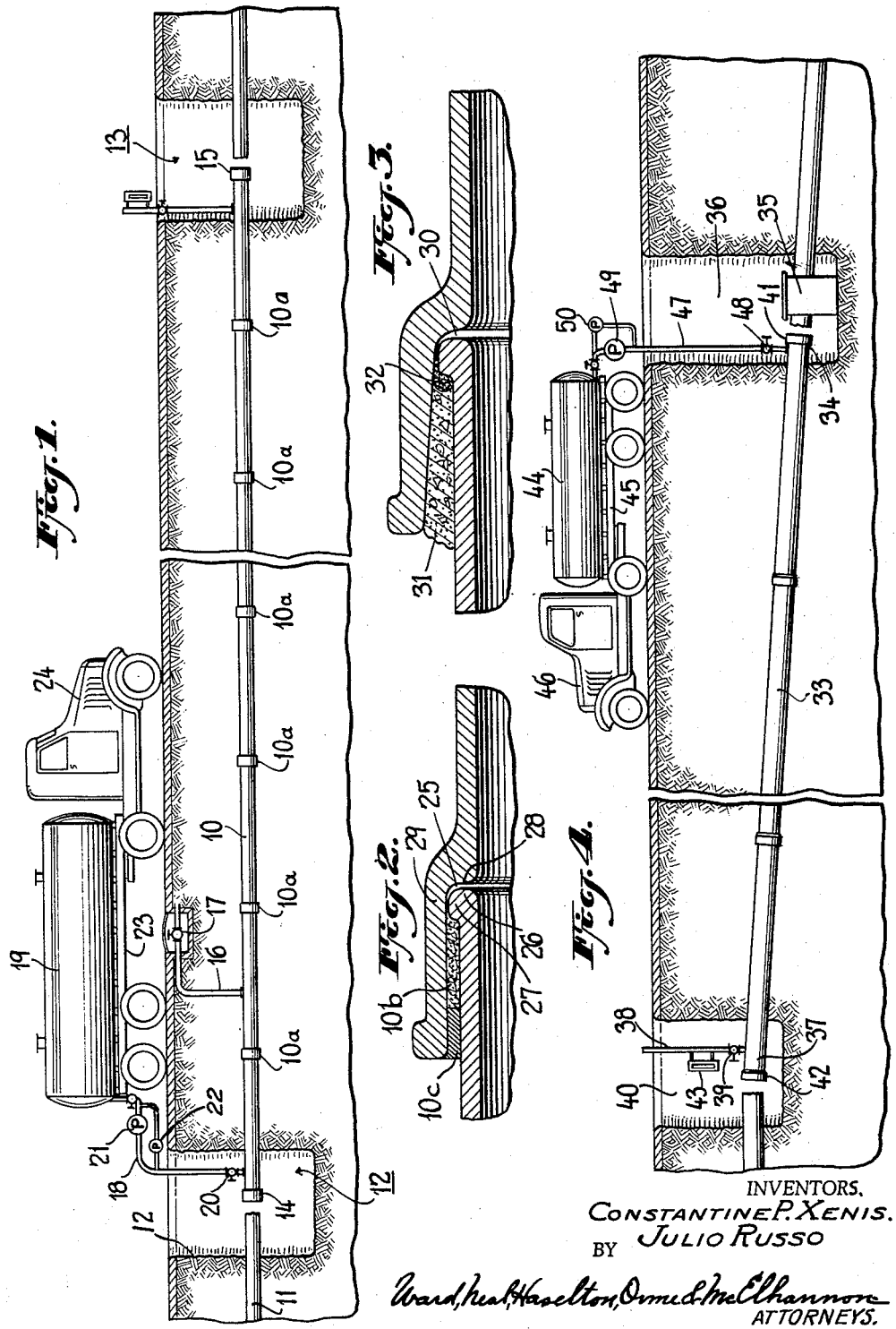

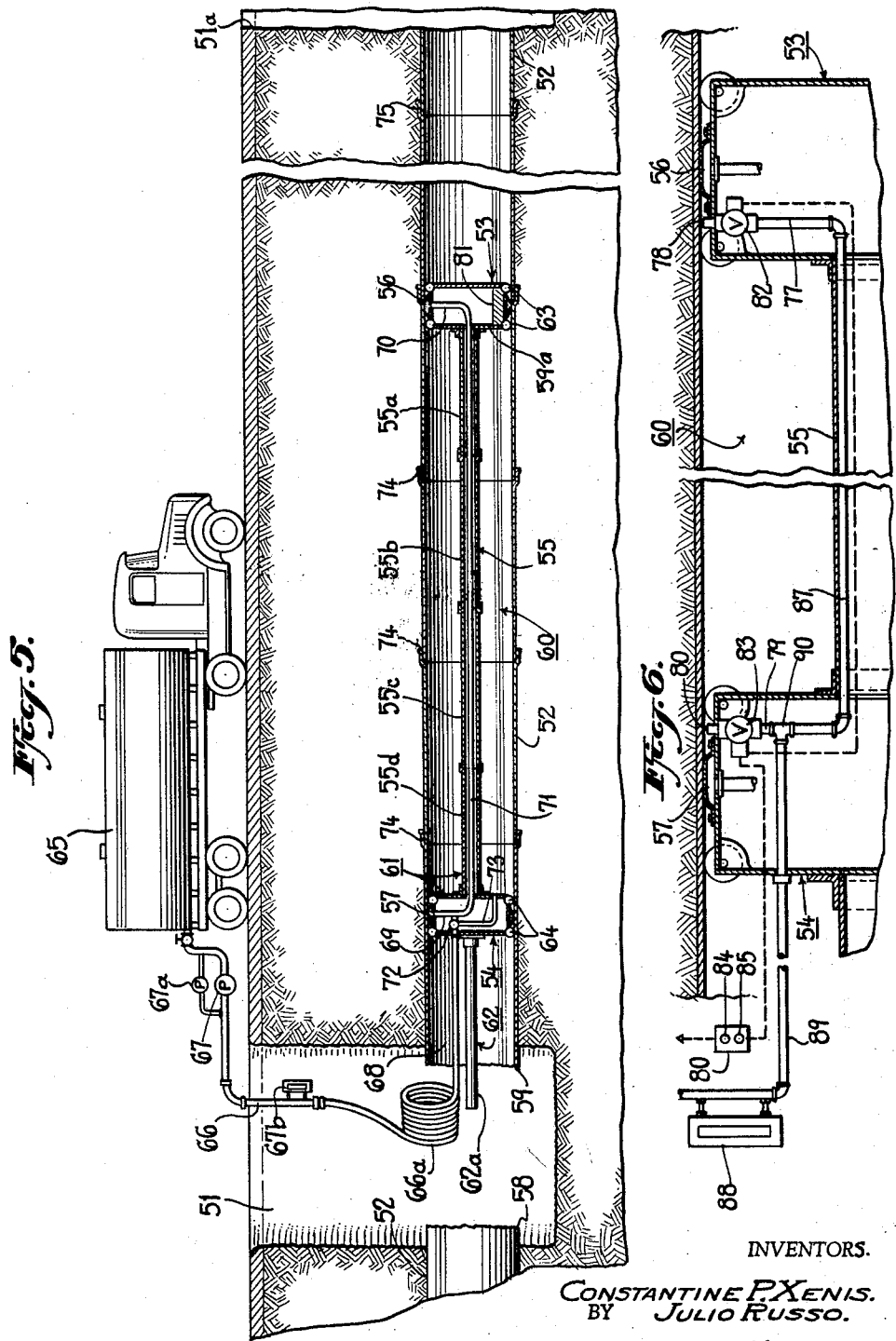

3,163,181
METHOD AND APPARATUS FOR SEALING JOINTS IN CONDUIT SYSTEMS
Constantine P. Xenis, Douglaston, and Julio Russo, Brooklyn, N.Y., assignors to Consolidated Edison Company of New York, Inc., New York, N.Y., a corporation of New York
Filed Oct. 2, 1957, Ser. No. 687,829
6 Claims. (Cl. 138—97)

This invention relates to the sealing of leaking pipe joints of a pipe system, and more particularly to a novel method for the inexpensive sealing in one operation of a plurality of such joints of a buried pipe system (such as a city gas main system) without the necessity for any excavation except those at the opposite ends of selected sections of such pipe undergoing the sealing method.

Most of such city gas main systems or public utility pipe line systems presently in use were installed many years ago for the purpose of conducting so-called "city manufactured gas" and hence the pipe joints and the packing therefor in such systems were designed for use with this particular type of gas. Such "manufactured gas" has a relatively high moisture content and is thus a relatively wet gas. Manufactured gas is expensive to make, requiring extensive manufacturing facilities and large numbers of personnel, together with a continual input of raw material, such as coal. In view of the relatively very low cost of natural gas, the discovery of large fields of natural gas wells, plus the advent of long distance pipe line systems interconnecting such fields with metropolitan and industrial areas has made conversion of such old gas main systems to the carrying of natural gas an extremely important and, in some instances, an economically mandatory step.

The expression "manufactured gas" as employed herein refers to ordinary city illuminating and fuel gas, such as that produced essentially from coal. It consists of water gas, to which may be added some coal gas, and some illuminants. The expression "natural gas" refers to inflammable gases such as those usually obtained from oil wells and used in certain communities as an illuminating and fuel gas. It consists mainly of paraffins (methane etc.), small amounts of hydrogen, ethylene, carbon dioxide and carbon monoxide. Broadly, natural gas is a mixture of those hydrocarbons usually associated with natural petroleum deposits. The propane and butane constituents are usually scrubbed out of the gas prior to use.

By converting such old gas main systems to the carrying of natural gas, it is, of course, possible for public utility companies to shut down their manufactured gas plants with accompanying substantial savings.

Such old gas main systems usually employ packing in the joints thereof of two types, namely: (a) jute packing backed by an outer layer of lead, and (b) cement or grout packing with a very small amount of jute inserted in the front end of the joint to retain the grout. It is believed that the former type of packing is for the most part employed in such old gas main systems. The expression "front end of the joint" refers to the inner portion thereof close to the gas passage, as opposed to the outer portion adjacent the bell of the pipe.

Natural gas is extremely dry and its use in such old gas main systems has deleterious effects particularly upon the jute packing of the joints in that after a period of use, which may be up to two or three years, it causes the jute to become dried out or dehydrated and thereby to become frangible and powder-like. Portions of such jute packing thus may be destroyed as a result of the presence of the natural gas in the mains.

The aforementioned cement or grout packing, while not subject to such dehydration and powdering by the natural gas (the grout and not any jute therewith being depended upon to make the seal), is nevertheless subject to leaks after many years use as caused, for example, by earth heaving or pipe vibration. Also, such heaving and pipe vibration can have damaging effect upon the jute and lead combination packing. The pipe vibration aforementioned may be caused by vehicles and trucks on the street nearby and may accelerate the powdering of dried jute and, of course, the deterioration of the cement type of packing. The movement of gas in the pipe causes removal of the dried jute thus exposing the next adjacent layers of jute to the drying influence of the gas.

The short individual lengths of pipe employed to make up such old gas main systems were for the most part originally shaped to form pipe joints of the bell and spigot type in a manner well known in the art and in which the innermost annular spaces are customarily filled by packing of either one of the aforementioned two types, that is, either by jute backed up by an outer layer of lead, or by grout with little or no jute. In such grout type of packing a very small amount of jute may be employed in the manner aforementioned. Such jute is customarily dipped in the grout and first inserted in the joint to prevent the grout subsequently placed in the joint from flowing into the pipe before it has had time to harden.

Consequently, some time following the conversion of an old "manufactured gas" main system to the carrying of natural gas, the system is plagued with a greater number of leaking joints than before requiring continuously, prior to the present invention, the services of large numbers of personnel and expensive equipment for repair.

Conventional prior art procedures have been employed for repairing such leaking joints, including excavating a hole at each pipe joint location, each hole being deep enough to get under the joint, usually at least 5 feet, and of sufficient horizontal cross-sectional area to permit personnel to recalk and seal the joint or to install external leak clamps which are constructed to urge the two abutting pipe ends against a circular gasket made up of a rubber-like material.

Some gas main systems have many thousands of pipe joints and hence such prior art procedure is extraordinarily expensive and slow. It is not unusual for a gas public utility company to be required to make appropriations of the order of many hundreds of thousands of dollars for the purpose of sealing only a few hundred pipe joints.

The invention, in one aspect thereof, comprises a method for overcoming the aforementioned problem and embraces broadly the following steps:

The selecting of a predetermined length or section of gas main, having a plurality of joints, and isolating such section by capping the opposite extremities thereof, this being accomplished by the digging of only two excavations, namely, one at each extremity thereof. Such predetermined length or section of gas main may be, for example, 300 to 600 feet or more in length, depending upon the diameter of the pipe. The gas main thus must be cut in each of such two excavations, the section ends capped and any service outlets closed. The end caps used for capping such section are equipped with fittings for the purpose of connecting liquid supply lines, pressure gauges, indicators and other suitable instruments required in the operation of the invention, for example, required for the injection of liquid sealant into the pipe section in the manner set forth below. The sealant then is pumped into the pipe section to fill same and is raised to a selected pressure, e.g., 25 to 50 p.s.i. The sealant while under such pressure is caused to remain in the pipe for a selected time to insure that it penetrates to a desired degree into all of the packing of the joints. Such liquid sealant, where jute packing is employed, permeates the interstices of the jute thereby to seal any leakage paths formed therein. The liquid sealant thereafter is pumped out of such pipe section except that portion of the sealant which remains by virtue of having impregnated or penetrated the packing in the joints, or other leakage paths. Also, some of the liquid sealant may remain in the pipe section in the annular crevices of the joint although not actually forced into the packing material.

The liquid sealant thus is injected into the selected section of pipe but a single time for a selected period, it not being necessary to employ any other type of liquid. Another section is then similarly treated.

Such liquid sealant in a preferred form thereof comprises a suspension of solid particles of a sealing ingredient, such as milled neoprene, in a vehicle, such as water, there being other ingredients as will appear below. Such substance may be syrup-like in consistency but sufficiently flowable and liquid to be easily pumped from a tank into such section of pipe and back into the tank. Such sealant is designed especially for coacting with jute packing in the joints to form therewith substantially a fibrous solid substance which has rubber-like or rubbery characteristics, although the invention is not limited to the latter feature. The liquid sealant is designed to fill and occupy the interstices between the fibres of the jute where it can change into such a solid substance for effectively plugging all of the leaks in the joint. Also, such sealant is effective to fill satisfactorily defects or interstices which form leakage paths in cement or grout packing and to form therein such solid leak-sealing substance.

Certain preferred forms of such liquid sealant have been developed and are manufactured by the West Chester Chemical Company of West Chester, Pa. specifically to meet the objectives outlined above. Such forms of sealant are marketed under the trademarks: "Rock-Seal" and "Con-Seal."

One of the principal advantages of the use of this method is that it is successful in sealing leaks despite the fact that portions of a packing, such as of jute, may have become partially destroyed thereby producing a large leakage path.

Normally the leakage paths in a joint are of an extremely small cross-section, probably of the order of $\frac{1}{10,000}$ of a square inch but of a length of more than 1 inch. The "Con-Seal" or similar material, when forced into these passages, leaves a permanent sealing material therein. The invention is also effective to seal leaks in plumbing joints of the threaded type where portions of the threads have become damaged as by corrosion.

Automatic sealing machinery has been suggested in the past for the sealing of leaking joints in larger diameter pipes, for example, of the order of forty-eight inches in inner diameter. However, it is difficult, if not impossible, to insert any automatic sealing machinery into small diameter pipes, and hence the method of sealing joints in accordance with the present invention is of substantial commercial importance because of the ease and extraordinarily low cost by which leaks may be sealed in such small diameter pipes. The expression "small diameter pipes" normally embraces pipes of the order of ten inches in inner diameter and under, other typical examples of such smaller inner diameters being eight, six, four and three inches, and occasionally even smaller sizes. However, the invention is not limited to the sealing of joints of small diameter pipes, it being, of course, adapted to seal pipe joints of any diameter.

However, in the sealing of joints in large diameter pipes, a problem arises of bringing enough liquid sealant to the site of the selected section of the pipe system. A relatively small amount of liquid is required to fill a large section of small diameter pipe. However, a large volume is required to fill a large diameter pipe, and a correspondingly small length of large diameter pipe must be isolated unless a large amount of liquid sealant is to be employed.

If course, it is possible to transport to the location of the isolated section of gas main a number of tanker trailers full of the liquid but this practice has certain cost aspects which may make it undesirable. Hence there is a relationship between the volume of liquid to be used and the cost of the sealing operation. Also, the cost of the liquid sealant itself must be considered.

Accordingly, it is one of the objects of the present invention to provide a novel method for sealing leaks in pipe joints of buried pipe systems, which method is inexpensive, rapid and effective and which requires a minimum of excavation and equipment.

The above and further objects and novel features will more clearly appear from the description set forth below when read in connection with the accompanying drawings, the latter comprising illustrations of preferred forms of apparatus for executing the novel method, it being understood that the drawings do not define the limitations of the invention, reference for this latter purpose being had to the appended claims.

In the drawings:

FIG. 1 is a schematic illustration comprising a longitudinal view of a selected substantially horizontal length of a buried gas pipe, partly in section and with parts broken away, which has been isolated for purposes of introducing the liquid sealant by the equipment shown in this figure;

FIG. 2 is a vertical fragmentary longitudinal cross-sectional view, partly in section and with parts broken away, of a pipe joint having a packing including jute or the like fibrous substance, which joint is sealed in accordance with the present invention;

FIG. 3 is a vertical fragmentary longitudinal cross-sectional view, partly in section and with parts broken away, of a pipe joint having a packing composed largely of a hard solid substance such as cement and a small amount of jute as aforementioned, which joint is sealed in accordance with the present invention;

FIG. 4 is a schematic illustration somewhat similar to FIG. 1 except that the section of pipe is inclined;

FIG. 5 is a schematic illustration comprising a longitudinal view of a selected length of a large size gas pipe, partly in section and with parts broken away, and showing devices comprising a second embodiment of the invention, which devices embrace apparatus for carrying out the method also embodying the invention; and FIG. 6 is a schematic illustration of certain details of the apparatus of FIG. 5 not shown in the latter figure.

Referring to the drawings in greater detail, the novel method embraces broadly the following steps:

(1) Determining a selected length 10 (FIG. 1) of buried gas main 11, which length includes a plurality of joints 10a to be sealed, and digging two excavations 12 and 13 at separated points to a depth somewhat below the depth of the gas main, the excavations, for example, being separated by 300 to 600 feet, depending on the diameter of the pipe, although the length can be any selected value, depending upon the amount of liquid sealant it is desired to employ. Each joint 10a, for example, is of the type shown in FIG. 2 having a packing comprising jute 10b and lead backing 10c.

(2) The selected length 10 is cut in each excavation, and the ends thereof are sealed by sealing caps 14 and 15 and any service outlets, such as 16, closed as by valve 17 thereby isolating such section from the rest of the system. Such service valve 17 is normally easily accessible on the premises of the user.

(3) Thereafter the selected length 10 of the gas main, by means of a conduit 18, is placed in communication with a tank 19 containing the liquid sealant. Conduit 18 has interposed therein a valve 20 and also a primary pump 21 as distinct from a smaller or secondary pump 22 to be described in greater detail hereinafter. The tank 19 is mounted upon a trailer 23 connected to a truck 24. The sealant is pumped into the section 10 by primary pump 21 thereby filling the section. The liquid pressure in the section is raised, for example, to 50 p.s.i., there being set forth below a detailed discussion of the techniques employed for so raising and maintaining such pressure.

(4) The liquid sealant under such pressure is caused to remain therein for a selected period, for example, three hours, to insure that it penetrates into the joints, for example, into the interstices of any jute packing and fills up any packing regions which have become destroyed as by powdering as aforementioned.

(5) After the expiration of the aforementioned selected length of time all the liquid sealant is pumped out except that portion which remains in the joints and, for example, which includes the sealant impregnating the jute.

The sealant can be forced into the selected section of gas main until it is completely filled and before the build-up of the desired sealant pressure therein, for example, by gravity, by pressurizing of the tank 19, or by the primary pump 21. After such section has been completely filled with the liquid sealant the pressure thereof can be built up to the aforementioned desired value, e.g. about 50 p.s.i., by applying gas pressure to the liquid in the tank 19. The same thing can be accomplished by said smaller secondary pump 22, the function and operation of which will now be described.

Once the aforementioned desired pressure, e.g. 50 p.s.i., has been established in the selected section of pipe, there is a tendency for such pressure to drop gradually for two reasons:

(a) Small pockets of gas, such as air in the vicinity of the joints, are eliminated by driving such gas out of the joint at the selected pressure, such as 50 p.s.i., via existing leaks. Some joints, if they are in very bad condition allow a certain amount of the liquid sealant to pass through the joint and then outside of the pipe before a seal is accomplished. Consequently the loss of such gas and the loss of liquid will result in a pressure reduction. It is then necessary to restore the pressure of the liquid sealant to such desired value as 50 p.s.i. by forcing more liquid into the pipe section. This has been accomplished, for example, by employing the aforementioned secondary pump 22 preferably of the reciprocating piston type which is capable of injecting a preselected small increment of liquid per stroke. For example, it may be capable of injecting about 2 ounces of such liquid sealant per stroke. These increments of liquid so injected into the pipe by the small pump can be and are carefully measured as by counting the pump strokes thereby providing an accurate indication of the loss of liquid and the loss of gas through the joints. In actual practice it has become a commonplace occurrence that on the first restoration of the selected pressure of 50 p.s.i. approximately 1 to 2 quarts of the liquid sealant must be injected into the selected section of pipe. The pressure drop, which is corrected by the injection of such amount of liquid, may occur by way of example in about 15 minutes. The loss of pressure and subsequent injection of liquid into the section of pipe may possibly be repeated several times before the pressure in the section is maintained uniformly at substantially the desired value. Under normal conditions, a lower loss of pressure occurs when the interval of time for the pressure loss is relatively extended whereby the selected pressure can be restored to 50 p.s.i. by the injection of relatively small quantities of sealant. Conversely, relatively higher losses of pressure usually occur when the interval of time therefor is relatively short.

After the expiration of, e.g. one hour from the first injection of liquid to the selected pressure (50 p.s.i.) and possibly after the occurrence of 4 or 5 cycles of pressure loss and restoration, a point is reached where the addition of a very small increment of liquid sealant causes a large increase in the pressure in the selected section of pipe. This is normally a signal that stabilized pressure conditions are about to occur and that a selected pressure of 50 p.s.i. may be maintained in the pipe section for an indefinite period. When all of the leaks are sealed, the pressure conditions in the selected section are stabilized and no noticeable loss of pressure will occur. After this point has been reached, the liquid sealant is normally maintained under the selected pressure for one or two hours (and in some circumstances for longer, as aforementioned). Thereafter it is pumped out and the liquid sealing operation is considered completed, it being understood, of course, that the selected section is placed again in communcation with the gas main system as before.

(b) Under average conditions the time during which the sealant is under pressure lasts approximately three hours. Frequently other problems of loss of liquid also may occur as a result of other conditions, for example, as the result of a broken gas main or a broken service connection. This may delay the completion of the sealing operation and require considerably more time than the aforementioned two or three hours. By observing the operation of the pressure gauges installed on the main or in communication therewith, it is possible to determine whether loss of liquid occurs through some defect in the line, for example, a broken main or broken service connection. The loss of liquid sealant will produce a pressure drop and lack of pressure stability which normally gives an unmistakable indication of this particular type of problem. Consequently, when the liquid sealant pressure is restored to the selected value, e.g. 50 p.s.i., by the aforementioned small reciprocating pump and such pressure is gradually restored, there is an indication that these is a large amount of gas, such as air trapped in the selected section, and the pointer of the pressure gauge will indicate such gradual pressure rise in response to the compression of the air. However, if the selected section of pipe is relatively free of air but there is a substantial leakage path, as via a broken main or service connection, the pressure gauge pointer will move rapidly with each injection of liquid into the section and then will drop rapidly. Thus by observing the behavior of the pressure gauges and by measuring the amount of liquid required to restore the sealant pressure, it is possible to obtain a considerable amount of useful information on what is occurring in the particular section of pipe. Apropos to leaky service connections, we have found that such connections which are threaded to the cast iron gas main occasionally are not tight or are partly corroded thus permitting a loss of gas. The sealing procedure embodying the present invention will effectively seal such leaks at the threads. Furthermore, occasionally there is encountered a service connection which is corroded, as by rust, and which not only causes large leakage of the gas but also causes a loss of the liquid sealant when carrying out the present invention, such connection being corroded to such a degree that its leakage paths are too large to be sealed by the aforementioned liquid sealant. In such latter case, by applying pressure gauges to the several or various service connections and observing the nature of the pressure drop at each, it is possible to locate the defective and corroded service connection and to repair it before the sealing operation is completed.

The sealant, as aforementioned, in one desirable form thereof, consists of a suspension in water of fine particles of neoprene and other materials, although the invention in other forms is not necessarily limited to this particular sealant.

Under step (4) aforementioned the sealant is caused to flow through the joint along the same path as any gas leak which may exist therein. In so doing a "filtering" or filter-like action takes place which allows the solid particles of the sealing substance, for example, the particles of neoprene, to be trapped in the interstices of the jute or at any other small openings along the path of flow and thereto agglomerate. By continuing this operation for a considerable length of time, for example, up to three hours, the jute will be suitably impregnated with the solid particles whereupon there will be no further flow of liquid through the joint.

At a later time, shortly after the liquid sealant has been withdrawn, except for the residual portion remaining in and around the joints, and the natural gas flows through the pipe section, the gas, being very dry, will carry away moisture from such residual sealant and aid in converting the latter, which is at this time rather gummy and viscous, into a dry resilient mass which forms an effective seal or gasket.

Experience and tests in the field show that excellent sealing results have been obtained, the joints being packed with either cement or jute.

Where the pipe joint packing is of cement or grout and is sound and thus not leaking, there is no flow of sealant through the packing in such joint. But where the packing is of jute and is sound, there will not occur the same degree of penetration through the jute as compared to where a leak exists. There will, however, be a certain amount of penetration of the liquid sealant into the jute of the sound joint which will aid in preserving the jute from further drying by the natural gas. That is, the liquid sealant will permeate or penetrate to a certain degree into a sound jute packing having no leaks and a certain amount of the sealant will remain therein and thereon. When such sealant becomes later dry or "cured" due, e.g. to the action of the dry natural gas, it will form a barrier between the natural gas and the jute thereby to prevent the latter from drying out due to the natural gas.

While the liquid sealant "Rock-Seal" or "Con-Seal" can provide a good seal while wet, that is, while gummy and viscous and before drying, the early drying thereof is desirable because it makes the seal more stable and more resistant to joint damaging forces, such as those incidental to the slight heaving of the earth or incidental to heavy vehicular traffic.

The syrup-like sealant impregnating the jute will eventually dry out, as aforementioned, under the drying action of the natural gas, thereby converting the combination of the dried sealant and jute to a solid stable and novel rubbery substance. It is to be noted that the portions of the sealant which do not penetrate the interstices of the jute also become a rubbery resilient substance.

Apparently one of the reasons why the aforementioned liquid sealant of the West Chester Chemical Company has been successful when employed in the present method is because of its degree of filterability in a leaky jute joint as compared to the degree of filterability of gas through such leaky joint. Such sealant is capable of filling the leakage path spaces within the jute and is selected of such characteristics that when it is cured or dried it becomes a solid which is advantageously and preferably resilient.

One of the reasons for carefully controlling the length of time of application and the pressure of the sealant is as follows:

In the top portion of each pipe joint there is an arcuate space or region 25 (FIG. 2) between the end edge 26 of the spigot 27 and the inner surface 28 of the bell 29. An analogous space 30 is shown in the joint of FIG. 3 which is of the cement or grout type having an outer or main packing 31 of cement and a small bit of cement dipped jute 32 at the inner end thereof. Gas or air can collect in the regions 25 or 30, for example, in the form of bubbles, and under the special circumstances set forth below can successfully resist the direct passage therethrough of the liquid sealant into the packing. The sealant may compress such gas or bubbles in this space and, if the joint does not leak at such top region adjacent such collected gas at a pressure of 50 p.s.i. which is also the pressure of the liquid, the gas cannot be squeezed out and will form a barrier to the passage of the sealant directly therethrough as aforementioned. Hence, in order to seal such portion of the packing adjacent such gas filled space, the sealant must be forced therein around the lower ends of such space and with the aid of high pressure and capillary action caused to penetrate such packing protected by the gas in such gas filled space. However, this may take quite some time. Hence it has been found desirable in some instances to maintain the liquid sealant in the pipe section for the rather extended time of up to three hours at the pressure of 50 p.s.i. in order to insure that such capillary action and full impregnation takes place.

However, if a leak does exist near or adjacent the aforementioned gas region 25, and even if such leak is slight, then it may take as little as five minutes for such gas to be forced out of such region 25 at the top of the joint. After the gas has been so squeezed out, additional time must be allowed to permit the sealant to penetrate the jute.

The aforementioned gas main systems for carrying manufactured gas were laid or installed in such a way that substantial sections thereof, such as 33 (FIG. 4), tend to drain by gravity toward a preselected low point 34 at which a drip box, such as 35, is installed. This practice was followed in such mains because manufactured gas tends to deposit liquid components upon the inner surfaces of the main and such components have to be removed by pumping same from such drip boxes in order to prevent the gas main system from becoming unduly fouled. For this reason, in carrying out the present invention, the location at which the liquid sealant is injected into the main is usually selected comprising one of such low points 34, namely, adjacent a drip box and in an excavation 36. The opposite extremity 37 of such selected section 33, which extremity is usually the higher extremity, is provided with a vent conduit 38 to the atmosphere, such conduit having a valve 39 therein for closing same. Extremity 37 is in excavation 40. Extremities 34 and 37 are covered by end caps 41 and 42, respectively. If the selected section of pipe has a high spot located intermediate the extremities thereof, the vent conduit to the atmosphere (analogous to 38) is provided there in order to permit the driving out of all of the air from the selected section in response to the filling of the pipe completely with the liquid sealant. Each of such vent conduits to the atmosphere is provided with a valve 39 as aforementioned, and also with a visible indicator 43 which will show visually the presence of the liquid sealant when it reaches such indicator. When the liquid sealant appears in the visual indicator 43, the vent valve 39 is closed before the liquid sealant is placed under the desired pressure, for example, 50 p.s.i.

The liquid sealant is fed to the section 33 by means analogous to those shown in FIG. 1, namely, from a tank 44 mounted on a trailer 45 connected to a truck 46. Tank 44 is connected to low end 34 of section 33 by a conduit 47 having interposed therein a valve 48 and a main pump 49. A suitable secondary pump 50 is also connected to conduit 47.

In one form of the invention the selected and isolated section of a gas main may be subjected to a vacuum prior to the injection of the liquid sealant therein for the purpose of facilitating such injection and also for the purpose of facilitating the penetration of the sealant into the pipe joints and their packing by removing any gas barriers, such as gas bubbles, which may be held in certain regions of the joint. However, the employment of such vacuum step is not necessary to the successful carrying out of the invention.

The two main ingredients of the sealant, namely, the sealing ingredient and the vehicle, can form a mixture although the invention is not limited thereto, it being possible for such association of ingredients to form a chemical compound. Three principal characteristics of the liquid sealant are: (a) the difference in degree of filterability of the vehicle and the sealing ingredient per se, for example, the difference in filterability between water and the finely milled neoprene; (b) the difference in degree of filterability between the gas in the main and such sealing ingredient; and (c) the difference in degree of evaporability between the vehicle and the sealing ingredient.

The liquid sealant, identified by said trademarks, comprises broadly a suspension of neoprene particles in water plus other ingredients. The neoprene particles comprise for the most part the leak sealing ingredient, the water comprising a vehicle therefor. Such sealant when combined with jute and "cured" or dried provides the novel elastic packing substance of resilient nature having the jute fibres therein in considerable density. An elastic filler is created when the sealant is "cured" or dried alone, the presence of the jute fibres being unnecessary for the formation of such elastic filler. Thus it will be noted that under the latter circumstances the sealing ingredient itself can fill the unoccupied or void spaces in the packing with a substance referred to above as an elastic filler which is of a rubbery consistency.

Although the liquid sealant described in the preceding paragraphs has employed water as its vehicle, the invention is not necessarily limited thereto, the possibility not being excluded of using, for example, some type of alcohol as such a vehicle. The sealing ingredient fills the voids and hence seals the joint by becoming a solid or at least by becoming a highly viscous or plastic mass having a sealing action. Such alcohol when used as a vehicle is limited to a vehicle function alone.

Reverting to the contents of the liquid sealant "Rock-Seal" or "Con-Seal," this substance contains chloroprene or neoprene, liquid latex and silicone rubber. It also contains certain other resins.

In view of the fact that liquid latex is one of the ingredients of such "Rock-Seal" or "Con-Seal," the sealant at least partly consists of an emulsion of elastomers of well known character.

The sealant is broadly defined chemically as follows: a mixture of elastomers and resins, suitable curing agents and surface active agents, compounded so as to penetrate the voids and fissures of a porous material and having the ability to cure internally to a stable gastight seal.

A specific definition of one form of liquid sealant which may be employed in carrying out the present invention is as follows:

A milled neoprene, or other polymerized rubber-like material, emulsified with 54% water in the presence of a suitable emulsifying agent. The particle size of the milled neoprene is controlled to give proper emulsification. The pH of the aqueous portion can be controlled if desired, by the addition of alkali or ammonia, depending on the elements present. If desired, the penetration of the emulsion may be facilitated by the addition of a wetting agent.

The aforementioned liquid sealants, "Rock-Seal" and "Con-Seal," contain the following known ingredients:

(1) Neoprene in finely divided or milled form.

(2) An emulsifying agent, for example, soap.

(3) Ammonia or alkali, if desired, for pH control, the purpose being to prevent breakdown of the emulsion and hence to enhance shelf life of the sealant.

(4) Carbon black, employed as a color disguise where desired for the purpose of making all of the product a uniform dark color and also serving to enhance the strength of the cured rubber or rubber-like material.

(5)* A filler ingredient, for example, an inert oxide, such as a paint pigment, a clay or iron oxide; the aforementioned carbon black can be a filler, the function of the filler being to thicken the substance to a desired consistency.

(6)* Glycerin, the function of which is to make jute packing hygroscopic if desired.

(7) A wetting agent or penetrating agent, also known as a surface actant, the function of which is to facilitate the entrance of the sealant into the capillaries of the jute. An example of a wetting agent presently on the market is that sold under the trademark "AEROSOL" manufactured by American Cyanamid Co.

(8) A coagulant which is for the purpose of causing coalescence or agglomeration of the solids although a separate coagulant may not be necessary, it being possible for coagulation to occur because of evaporation of the vehicle, such as water; an example of a coagulant is: three parts $C_aSO_4$ mixed with 1000 parts of rubber. Acetic acid and benzene may also be employed respectively as a coagulant and a swelling agent. The acetic acid works against the ammonia or alkali. The benzene is capable of causing swelling of the jute fibres if the latter happens to be desired.

(9)* Anti-foamant, a suitable ingredient serving this purpose may be employed in those cases where it is found that the pumping and handling of the sealant produces undesired foaming of the sealant.

Certain of the advantageous properties of the sealant are as follows:

(1) *Swelling action.*—Although this property having to do with the swelling of the jute fibres is not essential to the satisfactory carrying out of the method, it may be employed if desired. At least it should not be excluded. Water or water and glycerin can be employed for this purpose. Water and alcohol also behave in about the same manner in the swelling of the jute fibres.

(2) *Viscosity of selected value.*—This refers to a flow phenomena and has to do with the rate at which the substance can flow past a given point along a channel of selected size. This characteristic is related to the degree of penetration of the liquid sealant.

(3) *Surface tension of selected value.*—This relates to the ability of the substance to pass through a small opening and is reduced by the employment of a wetting agent.

(4) *Coagulation ability or agglomerability.* — This relates to the "curing" wherein the emulsion disappears so that the water and the solid particles can separate in order that such solid particles can coalesce or agglomerate or otherwise get together in a mass and tend to swell. It is believed that there is a swelling of the sealing ingredient (e.g. neoprene particles) despite the loss of water when the sealant is forced into a joint; at least there is some suggestion of this.

(5) *Accretability.*—The ability of the particles to accrete, that is, to build up a coating on the fibres.

Regarding the particle size of the solid, such as neoprene, it is possible for such particles to be of colloidal size although they can be considerably larger.

The milled neoprene mentioned above refers to a fine particle size produced as by grinding of the neoprene rubber, the latter being a polymerized elastomer. The selection of particle size is a factor in obtaining a desired emulsion.

There is considerable evidence from a study of packings which have been sealed by use of the "Rock-Seal" or "Con-Seal" to the effect that there is but little accretion or building up of coatings of solid particles on the individual fibres but rather something more in the nature of an agglomeration of the particles in such interstices of the jute.

There is a considerable amount of filtering out of the solid particles of the liquid sealant in addition to such agglomeration, this having been determined by a study of joints which have been treated as above and opened, and wherein there is found a large accumulation of the solid neoprene on the surface of the jute comprising the areas of such jute which are directly exposed to the interior of the pipe.

For the purpose of aiding the liquid sealant to seal

---

* Not essential.

certain types of leakage paths, we have found it advantageous to mix into the sealant certain fibres, for example, fine glass fibres cut into very short lengths, e.g. ¼ inch. The purpose of employing such fibres is to accomplish the filtration of more solid materials, such as glass fibres and the neoprene so that the sealing action of the liquid, while the joint is still wet and thus prior to curing of the sealant, will be more effective and permit the application of higher gas pressures to the gas main promptly after it has been treated in accordance with the present invention.

It is not necessary to mix such fibres in the liquid sealant if the normal gas pressure in such selected section is low, for example, 1 p.s.i. or less. However, if the gas pressure normally is, for example, 10 to 20 p.s.i. and the gas flow in such section is restored before the sealant in its joints has had a chance to dry or cure and become substantially solid, the relatively higher gas pressure will tend to push away, extrude or destroy some of the liquid sealant otherwise retained in the joints because the sealant will be unable to resist the higher pressure.

In the event that it is desired not to mix such glass fibres into the liquid sealant, and where the normal gas pressure in the gas main is relatively high, such as the aforementioned 10 to 20 p.s.i., such difficulty of having the relatively high gas pressure push away some of the liquid sealant and thereby destroy the seal can be avoided by reducing the pressure of the gas restored immediately to the main to, for example, less than 1 p.s.i. which will serve the purpose of providing at least some gas to the service connections on the selected section and also serve the purpose of expediting the curing or drying of the liquid sealant in such joints. If the latter expedient is followed, it is, of course, necessary to carry out one additional step, namely, to return at some later time, for example, some days later, and to restore the pressure to its normal and higher value, such as 10 to 20 p.s.i.

However, where the aforementioned glass fibres are in fact mixed into the liquid sealant they will reenforce the jute and aid in filling the interstices of the latter by filtration which will increase the wet strength of the joint and permit the first restoration of the gas pressure into the main at pressures considerably higher than the aforementioned 1 p.s.i. and possibly at the desired higher normal pressure, namely, 10 to 20 p.s.i. while the joints are still wet. At least it will permit the restoration of gas pressure at some value intermediate the limits aforementioned.

It has been found that, even in those extreme cases where substantially all of the jute packing, as at 10b, has been destroyed and only a lead packing 10c has remained, a satisfactory seal can be made by the use of the "Rock-Seal" or "Con-Seal" sealants aforementioned.

It has been found desirable, but not necessarily mandatory, that there be a penetration of some reasonable extent of such solids into the jute, for example, one-half inch to one inch whether or not there is a leak therein. A heavy concentration of solids at the inlet of the packing may act as a block to the passage of any further solids into the jute.

In summary, the present novel method embraces the following:

The isolating of a selected pipe section containing many joints, and the venting thereof. Thereafter such section is filled completely with a liquid sealant which consists of a suspension in a vehicle, such as water, of fine particles of an agglomerable solid sealing ingredient such as neoprene and other materials. Having filled the pipe with this liquid, the latter is subjected to considerable pressure of the order of say 25 to 50 p.s.i. This causes the sealant to enter any gas leakage paths, as in jute, and to flow therethrough. In so doing a "filtering" or filter-like action takes place which causes such solid particles to be trapped, for example, in the interstices of the jute, such solid particles also being so trapped in or at any other small openings along the path of flow and there agglomerating but nevertheless in some cases allowing at least some of the liquid to come through the joint with a materially reduced content of solid particles in suspension. By continuing this operation for a selected length of time the jute will be penetrated with the solid particles to a desired degree. Thereafter the liquid sealant is withdrawn from the selected section of pipe and the latter is reconnected into the system and natural gas allowed to flow therethrough. As the latter gas is dry, it will carry away any moisture from the sealant and convert the solid particles aforementioned into a solid mass which forms a good seal or gasket. Experience and tests indicate that within substantial limits the amount of jute or the condition of the jute, comprising the packing in the joint, is not important when employing the present method of sealing, it being capable of sealing very large leakage paths. Also, excellent results have been obtained in joints having concrete or cement packing (FIG. 3).

With respect to those joints which do not leak, there will be no flow of liquid sealant completely through the jute packing. Nevertheless there will be some penetration of the sealant into the jute which will preserve the jute from further drying by the natural gas.

We have found that the prompt insertion of the natural gas at low pressure into the selected section of pipe following the withdrawal of the liquid sealant is desirable because it quickly makes a dry surface skin upon the liquid sealant situated in each of the pipe joints.

Referring now to FIGS. 5 and 6, there will now be described a further embodiment of the novel method and also novel apparatus for carrying out the same. The apparatus is designed for the purpose of isolating a selected section of a relatively large diameter gas main although this embodiment of the invention is not limited thereto. Such novel method and apparatus necessitates the digging of only an excavation 51 for the purpose of sealing the joints of successive increments of a gas main 52. Another excavation 51a is also dug to allow airing of the section.

As aforementioned, when it is desired to seal the joints of a gas main of large diameter, such as 48 inches, the problem of transporting adequate sealant is a substantial one and it is not considered feasible to seal a very long section of large diameter pipe because of the extreme volume of sealant required. Also the cost of the liquid sealant per se is a factor in determining the economical carrying out of the invention.

In such novel apparatus (FIGS. 5 and 6) a pair of spaced pistons or sealing discs 53 and 54 are employed which are rigidly held in spaced relation by a central spacer tube 55 of selected length. Suitable gaskets or sealing rings 56 and 57 are provided respectively on the peripheries of such pistons and the liquid sealant is pumped into the chamber between such pistons. The volume of such chamber is limited by such selected length of the tube 55.

A section of the gas main between the points 58 and 59 in the excavation 51 is cut away and removed for the purpose of gaining easy access to the interior of the main 52.

Thereafter the first piston 56 is inserted in the main to which there is secured centrally of the inner face 59a thereof the rigid spacer tube 55, for example, 100 ft. in length, and which may be composed of several sections, such as 55a, 55b, 55c and 55d, which threadedly engage one another in succession in the manner shown.

After the spacer tube 55 has been assembled by securing its several sections together as aforementioned and the first piston 53 thus of necessity has been thrust into the gas main 52 by a distance at least equal to the length of such spacer tube, the second piston 54 is secured to the lefthand extremity of the tube 55 by any well known means, and piston 54 also is thrust into the main 52 thereby creating an isolated chamber 60 within the main 52 which is 100 ft. long, namely, equal to the distance between the inner faces of the pistons 53 and 54.

The assembly, comprising the two pistons 53 and 54 as held in rigid spaced relation by the tube 55, is collectively referred to as the rod and double piston assembly or device 61.

The latter device is, of course, axially shiftable within the gas main 52 by any suitable means, for example, by a rigid pusher rod 62, one section 62a of which is shown in FIG. 5, it being understood, of course, that additional similar sections may be successively secured together to form a continuous rod for the purpose of pushing or pulling the device 61 in the main 52.

Each of the pistons 53 and 54 is provided with a suitable peripheral sealing ring or gasket designated respectively 56 and 57 as aforementioned. Such sealing rings or gaskets preferably comprise peripheral deformable membranes which are able to swell outwardly in response to fluid pressure thereby to provide a seal to prevent leakage of the liquid sealant when the chamber 60 is filled with such sealant under pressure. Accordingly, such sealing rings 56 and 57 may be of heavy rubber or rubber-like substance.

For the purpose of protecting the gaskets or sealing rings 56 and 57, the pistons 53 and 54 are provided with small wheels or balls, such as 63 for piston 53, and 64 for piston 54, such wheels or balls being mounted on the periphery of their respective pistons and enabling easy axial movement thereof and at the same time preventing excessive frictional forces from damaging the sealing rings 56 and 57 as a result of movement in the gas main.

Fluid is directed into chamber 60 from a tank 65 via a conduit 66 in which there is interposed a primary pump 67 and a secondary pump 67a analogous to pump 22 above. The conduit 66 includes a coiled flexible section 66a which may be disposed upon a suitable reel (not shown) which enables the paying out of such conduit 66 in response to the movement of the assembly 61 into the gas main. A suitable indicator or gauge 67b is in communication with the conduit 66 for purposes described in detail above.

In lieu of moving the assembly 61 by means of the rigid push rod 62, it is possible to dispense with the latter and to employ gas pressure, such as air under pressure, to move such assembly, it then, of course, becoming necessary to seal the extremity of the gas main 52 at the region 68, for example, by a suitable stationary disc (not shown) and to direct into the space between such stationary disc and the piston 54 the gas under pressure. It is, of course, understood that the conduit 66 can be maintained in communication with the assembly 61 by any suitable means, such as a gland through the stationary disc.

The conduit 66 is in communication with the interior expansion chambers of the expansible sealing rings 57 and 56, respectively, by passages in conduits 69 and 70 respectively in the pistons 54 and 53. The conduit 69 is in communication with the conduit 70 via the hollow spacer tube 55 which in itself may be liquid-tight or alternatively a pipe section 71 within the spacer tube 55 may interconnect such conduits 69 and 70.

A suitable valve device 72 is interposed in the conduit 69 for the purpose of:

(a) directing the liquid sealant under pressure to the expansible gaskets 56 and 57 until the pressure therein reaches a selected value, such as 50 p.s.i.;

(b) whereupon the liquid sealant is directed into the chamber 60 but not before, via a conduit 73.

Thus the liquid under pressure is withheld from the chamber 60 until a suitable seal is formed peripherally of the two pistons 53 and 54.

The valve 72 is of any suitable construction to accomplish the above objective.

By employing the aforementioned assembly 61, a plurality of gas main joints, such as 74, positioned between the pistons 53 and 54 may be sealed by employing the method above set forth modified as required to accommodate the use of the assembly 61. The assembly 61 thereafter can be advanced in the conduit 52 to seal the next group of joints, one of which is shown at 75.

By employing such assembly 61 and its related apparatus, a carefully measured volume of liquid sealant can be employed for sealing large diameter gas mains, it being understood, of course, that the volume of the chamber 60 is equal to or smaller than the volume of the tank 65.

Referring now to FIG. 6, there will be described suitable means for venting the chamber 60, that is, for permitting gas, such as air in chamber 60, to be easily displaced in response to the filling of the chamber with the liquid sealant.

In order to avoid compressing air (or other gas) in the chamber 60, it is necessary to vent the high point of the chamber while it is being filled with such liquid. Hence it is desirable to provide means for venting either one extremity or the other of such chamber depending upon which is higher. This can be accomplished by the system of vent pipes shown in FIG. 6 wherein the piston 53 is provided with a vent 77 which has an outlet 78 positioned at the uppermost surface of the piston 53, there being an analogous vent pipe 79 mounted in the piston 54 and having an outlet 80 also at the uppermost surface thereof. In order to insure that the outlets 78 and 80 are positioned at the uppermost surfaces of their respective pistons, each of the latter may be weighted at a point diametrically opposite to its outlet 78 or 80. For example, the piston 53 may be provided with a weight 81 (FIG. 5) which is diametrically opposite the outlet 78, it being understood that the piston 54 is provided with an analogous weight (not shown).

The vent pipes 77 and 79, in the form shown, are provided with electrically operable control valves 82 and 83, respectively, which are in turn under the control of suitable electrical switches (not shown) actuatable by push buttons 84 and 85, respectively, the buttons being mounted on a switch box 86. Valves 82 and 83 normally may be maintained in an open condition until chamber 60 is filled with sealant, providing the section of the gas main 52 undergoing sealing is horizontal. However, if such section is tilted, the lowermost of the valves 82 or 83 should be closed at all times during the practicing of the invention on such tilted section.

The conduits 77 and 79 are interconnected via a pipe 87 which passes through the hollow spacer tube 55.

For the purpose of determining when the chamber 60 is filled with liquid sealant, a visible indicator 88 is provided which is connected to a vent pipe 89, the latter in turn being connected at 90 to, for example, the vent pipe 79 within the piston 54. The vent pipe 89 provides a passage for the air or other gas which is displaced from the chamber 60 by the introduction of the liquid sealant therein.

When the indicator 88 shows the presence of liquid sealant, it will be obvious that the chamber 60 has become filled whereupon the pertinent valve 82 or 83 is closed.

It will be noted that the outlets 78 and 80 are respectively located between their adjacent deformable membranes 56 and 57 and the chamber 60.

With regard to the pressure applied to the liquid sealant, after it fills the selected section of gas main, in some gas main systems large portions thereof normally are not subject to gas pressures in excess of 1 p.s.i., although other sections may be subjected to higher gas pressures, such as 10 to 20 p.s.i.

We have found that while gas under relatively low pressure, for example, 1 p.s.i. or less will leak through extremely small leakage paths or interstices, in order to seal such leakage paths a pressure of the order of 50 p.s.i. is needed to force the "Con-Seal" type of liquid sealant into the same leakage paths or interstices for the purpose of sealing same. Consequently, the pressure applied to the liquid sealant during the sealing operation is related to the normal gas pressure in the main or is related to the gas pressure which is to be applied to the main after the sealing operation. Furthermore, the pressure which should be applied to the liquid sealant is a function of the ability of such liquid sealant to penetrate such leakage paths or interstices. Such ability to penetrate is a function of many factors, among which certain of the important ones are the size of the particles of the sealing ingredient (such as milled neoprene) of the liquid sealant and, of course, the size of the leakage paths in the packing including the aforementioned small openings (pages 16 and 28).

The pressure applied to the liquid sealant of the order of 50 p.s.i. is found necessary to seal the leaks in a 1 p.s.i. gas main within the selected allotted time of the order of two to three hours. It may be possible to employ a lower liquid sealant pressure if the time of its application is greater.

Accordingly, where the normal gas pressure in the gas main is of the order of 10 to 20 p.s.i., it is clear that the gas will be able to leak through even smaller leakage paths and/or interstices in the packing, and accordingly, in order to seal same properly in accordance with the present invention, even higher pressures must be applied to the liquid sealant in order to force same into such relatively smaller leakage paths. Of course, such pressure must under no circumstance exceed or approach too close to the rupture pressure of the gas main and a suitable safety factor should be employed giving a safe margin between such rupture pressure and the pressure applied to the liquid sealant. The rupture strength of the gas main is a function of the thickness of the metal pipe, the type of metal and the diameter of the main and is normally easily determined.

The aforementioned relationship can be expressed mathematically as follows:

$$P = (f)\frac{pg}{t}$$

where:

P represents pressure of the liquid sealant.
p represents gas pressure in the gas main.
g represents a variable factor.
t represents the time of application of the liquid sealant.

g in turn is a function of the normal gas pressure and rupture pressure of the gas main. For example, where p is 1 p.s.i. or less, g can advantageously be 50 where t is of the order of three hours.

On the other hand, g increases in value as a function of the increase in value of p, it being understood, of course, that P shall never exceed the aforementioned rupture pressure of the gas main.

Reverting to the problem of air or gas in the selected section of gas main, it is, of course, important to vent or drive out both large and small air pockets in the selected section in order to obtain effective sealing results. In carrying out the invention comprising the present method and in employing the apparatus herein described, it is possible to drive out such gas in an effective manner. It is not a difficult problem to vent the main to the atmosphere wherever an elevation in the gas main may trap air or gas. This can be done, for example, by employing disconnected service connections to customers' locations, for example, to private houses. Such service connections thus may be temporarily opened to allow any air or gas to escape from such relatively elevated portion of the main, this being allowed until liquid is seen to flow at such service connection. An important advantage of the present invention comprises the ability to seal not only leaky packing in gas main joints but leaky threads in plumbing connections or small cracks in the gas main or in service connections. Furthermore, since the selected section of gas main is subjected to a liquid sealant under pressure, a hydrostatic test is of necessity applied to such section in the carrying out of the invention and the application of such hydrostatic test results in either the sealing of any leaks therein without further action or if it is impossible to maintain a stabilized liquid pressure in such section such hydrostatic test reveals the existence of leaks of a large nature resulting, for example, from corrosion not only in the gas main but in service connections. Such relatively large leaks, of course, are located and repaired before the selected section is put back into service. Consequently, for the first time in this art a selected section of gas main can be completely sealed. That is, it is possible, by means of the present invention, to seal not only the joints as aforementioned, but other openings, thus leaving each selected section and all of its connections in a satisfactory operating condition. Furthermore, there is no need to clean the gas main (e.g. of deposited gums) prior to or during the practice of the present invention. Thus the expenditure of considerable time an effort is avoided which has heretofore been necessary in the practice of the prior art.

As aforementioned, there may be deposited on the inner surfaces of a gas main foreign matter, including certain gums and other substances, as a result of the flow of gas therethrough, particularly manufactured gas. This foreign matter may collect in the bottom of the gas main and cover portions of the packings of joints over the bottom regions thereof, that is, along the lowermost arcuate parts of the joints. Also it is possible for foreign matter, such as mud, to find its way into a gas main also to cover the lower portions of packings. Such foreign matter may form a barrier to the direct passage of the liquid sealant into the adjacent packing. Where the packing is a fibrous substance, such as jute, the present invention is able to overcome the difficulty caused by such foreign matter interposing itself in the direct path between the joint and the liquid sealant. That is, the sealant under pressure is able to work its way around the ends of such foreign matter and into the portions of the packing so covered. The sealant is forced into such portion of the packing by capillary action aided by the pressure to which the sealant is subjected.

Thus the sealing of such portions of the packing masked by such foreign matter is accomplished in a manner analogous to the above described sealing of the upper portions of a packing which may be shielded by gas bubbles, for example, of air. This constitutes a substantial advantage of this invention inasmuch as it eliminates the necessity to clean the gas main of such foreign matter unless, of course, the latter occurs in excessive quantities.

What is claimed is:

1. A process for sealing small leaks in a main disposed to contain a flow of substantially anhydrous gas, comprising isolating a section of the main between fixed limits, removing the said gas from said section, flooding a sealing composition into the isolated section of the main to substantially fill the entire isolated section, said sealing composition being a liquid suspension of finely divided particles of polychloroprene, applying an external pressure on the sealing composition disposed in said isolated section to drive the sealing composition into the leaks and thereby to cause penetration of the leaks by the liquid and deposit of the particles in the leaks, maintaining said pressure until the leaks are sealed by the deposited particles, removing the remaining sealing composition from the main, and thereafter re-introducing a flow of substantially anhydrous gas therethrough.

2. A process for sealing small leaks in a main disposed to contain a flow of substantially anhydrous gas, comprising isolating a section of the main between fixed limits, removing the said gas from said section, flooding a sealing composition into the isolated section of the main to substantially fill the entire isolated section, said sealing composition being a liquid suspension of finely divided particles of polychloroprene, applying an external pressure in the range of 25 to 50 p.s.i. on the sealing composition disposed in said isolated section to drive the sealing composition into the leaks, and thereby to cause penetration of the leaks by the liquid and deposit of the particles in the leaks, maintaining said pressure until the leaks are sealed by the deposited particles, removing the remaining sealing composition from the main, and thereafter reintroducing a flow of substantially anhydrous gas therethrough.

3. A process for sealing small leaks in a main disposed to contain a flow of substantially anhydrous gas, comprising isolating a section of the main between fixed limits, removing the said gas from said section, flooding a sealing composition into the isolated section of the main to substantially fill the entire isolated section, said sealing composition being a liquid suspension of finely divided particles comprising from 25% to 55% by weight of suspended particles of polychloroprene, applying an external pressure in the range of 5 to 100 p.s.i. on the sealing composition disposed in said isolated section to drive the sealing composition into the leaks, to thereby remove the suspending medium by forcing it out of the main and leaving the particles behind, maintaining said pressure until the leaks are sealed by the remaining particles, removing the remaining sealing composition from the main, and thereafter re-introducing a flow of substantially anhydrous gas therethrough.

4. A process as set forth in claim 1 wherein said sealing composition further comprises short length fibres mixed therein.

5. A process as set forth in claim 1 wherein said sealing composition further comprises an emulsifying agent, a wetting agent and a coagulant.

6. A process for sealing small leaks in a main disposed to contain a flow of substantially anhydrous gas, comprising isolating a section of the main between fixed limits, removing the said gas from said section, flooding a sealing composition into the isolated section of the main to substantially fill the entire isolated section, said sealing composition being a liquid suspension of finely divided particles of rubber-like material which, upon removal of the liquid suspending medium, will agglomerate and coalesce without further treatment thereof, applying an external pressure on the sealing composition disposed in said isolated section greater than the pressure external to said section to drive the sealing composition in to the leaks and thereby to cause penetration of the leaks by the liquid and deposit of the particles in the leaks, maintaining said pressure on the sealing composition until the leaks are sealed by the deposited particles, removing the remaining sealing composition from the main, and thereafter re-introducing a flow of substantially anhydrous gas therethrough.

References Cited by the Examiner
UNITED STATES PATENTS

| | | | |
|---|---|---|---|
| 1,736,293 | 11/29 | Van Denburg | 138—97 |
| 1,805,245 | 5/31 | Hopkinson et al. | 18—58 |
| 2,094,691 | 10/37 | Williams. | |
| 2,094,692 | 10/37 | Hitz. | |
| 2,315,552 | 4/43 | Skeen | 138—97 XR |
| 2,386,764 | 10/45 | Zwicker et al. | 260—29.7 |
| 2,564,882 | 8/51 | Cubberly | 260—17 |
| 2,804,147 | 8/57 | Pistole | 138—97 XR |
| 2,808,852 | 10/57 | Brant | 138—97 |
| 2,837,122 | 6/58 | Shaw et al. | 138—97 |
| 2,912,350 | 11/59 | Videen et al. | 260—29.7 |

FOREIGN PATENTS

| | | |
|---|---|---|
| 142,419 | 5/20 | Great Britain. |
| 212,715 | 3/24 | Great Britain. |
| 572,640 | 10/45 | Great Britain. |

OTHER REFERENCES

"India Rubber World," vol. 102, No. 1, pp. 43–45, April 1, 1940.

EDWARD V. BENHAM, *Primary Examiner.*

JACOB A. MANIAN, LEWIS J. LENNY, *Examiners.*